United States Patent Office 3,505,371
Patented Apr. 7, 1970

---

3,505,371
PROCESS FOR PRODUCING PHOTOSENSITIVE CHEMICAL COMPOUNDS
Daniel J. Shanefield, 119 Jefferson Road, Princeton, N.J. 08540
No Drawing. Continuation-in-part of application Ser. No. 544,810, Apr. 25, 1966. This application Jan. 14, 1969, Ser. No. 791,169
Int. Cl. C07f 1/10, 7/24
U.S. Cl. 260—430                3 Claims

ABSTRACT OF THE DISCLOSURE

A stable, photosensitive compound is formed by reacting a metal which may be lead or a metal more noble than lead in the electromotive series, in a chemically combined form in which it is reducible to a lower valence, with a strong reducing agent having an E° value of about —0.5 to about —0.85, in the presence of a base and in the absence of visible light, followed by washing the photosensitive product in a solution of the acid form of the strong reducing agent.

---

This is a continuation-in-part of United States patent application Ser. No. 544,810, filed Apr. 25, 1966, now abandoned.

It is the object of this invention to provide a method of producing photosensitive chemical compounds which combine a metal in chemically combined form such that it is reducible to a lower valence state and a strong reducing agent which normally, in the absence of special precautions, is strong enough to reduce the chemically combined metal.

It is a further object of this invention to provide such a process which produces such photosensitive compounds without incorporation of sequestering agents which, while they would be expected to stabilize compounds of the herein kind and make their production possible, would interfere with their photosensitivity.

Other objects of this invention will in part be obivous and will in part appear hereinafter.

I have found, quite surprisingly, that I can produce reaction products of strong reducing agents having E° values of about —0.5 to about —0.85 and chemically combined metals which are at least as noble as lead in the electromotive series, and preferably lead, copper, silver, gold or mercury, which are reducible in their combined form to a lower valence state upon exposure to visible light and therefore are useful where photosensitive compounds are used. The reduction of the compounds on exposure to visible light results in formation of a visible or latent image, the latter being developable by ordinary chemical developers such as Kodak D–72 or physical developers such as metal plus silver nitrate plus citric acid to a visible state.

The photosensitive reaction products are produced by reacting the strong reducing agent with the chemically combined metal in solution in an inert polar or non-polar solvent, and preferably in water or alcohol, and in the absence of visible light, in the presence of an alkali such as sodium hydroxide or potassium hydroxide or the like which is slowly added in sufficient amount to cause reaction of the reducing agent with the metal ion but not sufficient to reduce the metal ion to a lower valence state, at a temperature of from the melting point of the reaction solution to about 30° C. Ordinarily I react the metal compound and the reducing compound in approximately stoichiometric quantities, although this is not a critical element of my process. The product is recovered as a solid, and is washed with the acid form of the reducing agent. Particularly preferred metal compounds for use in my process are silver nitrate and lead nitrate, and very useful reducing agents are parabromophenol and gallic acid.

My conditions for preparing photosensitive compounds of reducible metal compounds and strong reducing agents are not required for preparation of compounds from such metal compounds and weak reducing agents such as potassium oxalate. However, if my conditions are not practiced in preparing compounds of the kind contemplated by me, wasteful and even hazardous unwanted reactions occur between the reducible metal ions and the strong reducing agent.

The strong reducing agent employed in producing stable photosensitive compounds in accordance with my invention, has a so-called E° value of about —0.5 to about —0.85 volt. The E° value is the standard electrode potential, which can be determined conveniently by measuring the electrical potential of an inert electrode, for example platinum, immersed in a solution containing equal concentrations of the reducing agent and the oxidized form of the reducing agent, at the pH of the reducing agent in its acid form, using a standard electrode such as a calomel electrode as the other electrode. This is described more fully in "The Theory of the Photographic Process" by C. E. K. Mees, Macmillan (second edition, 1954), pages 686 and 687. For the few reducing agents which do not have reversible oxidation reactions the method of determining E° is described in the above-noted Mees reference at pages 571 and 705.

Typical reducing agents useful in my process, and having E° values in the range of about —0.5 to about —0.85, are p-bromophenol, p-iodophenol, gallic acid, resorcinol, aniline, glycine, thioglycollic acid and benzene azoresorcinol.

It is known in the silver halide photographic art that the oxygen-containing reducing agents ordinarily used as developers, for example sodium sulfite and hydroquinone, are made stronger in their reducing actions as their solutions are made more alkaline. The reason for this effect is explained in the above-noted reference of Mees, at page 639, and in the tables on pages 571 and 693.

Ordinarily, when an easily-reduced metal such as mercury is chemically combined at a given valence, for example in this case a valence of two, and is then brought into contact with a strong reducing agent such as alkaline sodium sulfite solution, the metallic ion will be reduced to a lower valence state, i.e., one or zero. However, I have found that if the reducing agent is at a pH which is not too highly alkaline, which I achieve by controlling my addition of alkali, this reduction of the mercuric ion will not occur. Furthermore with regard to product stability, I have found that the photosensitive reaction product does not have satisfactory stability unless it is washed in a solution of the acid form of the reducing agent.

The reducible metal compound which is a precursor to my photosensitive compounds is a compound of a metal at least as noble as lead on the electromotive scale, and preferably a compound of lead, copper, silver, gold or mercury. Exemplary useful precursor compounds are the nitrates and trichloroacetates of the metals and the like.

Solvents useful in carrying out my process are nonpolar or polar inert solvents capable of dissolving the reactants. Such solvents include water, methanol, ethanol, benzene, diethyl ether and the like.

The alkali, otherwise referred to herein as a base, used to adjust the alkalinity of my reaction medium may be any alkali, such as sodium hydroxide, potassium hydroxide, sodium carbonate, triethylamine, pyridine or the like which is soluble in the reaction system. The amount of alkali to be added is that amount which causes the reaction to proceed, but which is short of the amount which will cause reduction of the reducible metal compound during the reaction.

The invention will become more apparent from the following descriptive embodiments of the broad inventive idea.

EXAMPLE 1

In the temperature range of 20° C. to 30° C., prepare a saturated solution of para-bromophenol in methyl alcohol. Also, in the same temperature range, prepare a saturated solution of silver nitrate in distilled water. Mix equal parts of the two solutions in red light. Filter off any precipitate and discard the solid precipitate. To the filtrate solution, slowly add a solution of one gram of potassium hydroxide dissolved in 50 ml. of methyl alcohol plus 50 ml. of distilled water, in the same temperature range. A white precipitate will form, and this precipitate is the silver salt of p-bromophenol. Continue to add the hydroxide solution until the precipitate barely darkens, and stop at that point. In less than five minutes, wash the salt precipitate with methyl alcohol, and then in a saturated solution of bromophenol in methyl alcohol.

The silver salt of p-bromo is not generally stable, and it is remarkable that the salt can be made at all from ionic solutions. This salt can be easily decomposed to a photographic image by heating at 100° C., or by exposure to direct, bright sunlight for one hour, or by treatment in a saturated solution of potassium hydroxide in methanol. Because of its sensitivity to self-destruction when stimulated, it is useful for making sensitive photographic plates and explosives. This salt is stabilized by washing it in a saturated solution of bromophenol in methyl alcohol.

EXAMPLE 2

In the temperature range of 20° C. to 30° C., prepare a saturated solution of para-bromophenol in benzene. Also in the same temperature range, prepare a saturated solution of silver trichloroacetate in benzene. Mix equal parts of the two solutions in red light, and filter off any precipitate and discard such precipitate. To the filtrate solution, slowly add a solution of one gram of ethylamine dissolved in 75 ml. of benzene, in the same temperature range. A white precipitate will form, and this precipitate is the silver salt of p-bromophenol. Continue to add the ethylamine solution until the precipitate barely darkens, and stop at that point. In less than five minutes, wash the salt precipitate with methyl alcohol, and then in a saturatd solution of bromophenol in methyl alcohol. The product is a photosensitive material which can be decomposed to a photographic image as noted in Example 1 above.

EXAMPLE 3

Method of Example 1, except that gallic acid is used instead of p-bromophenol, and lead nitrate is used instead of silver nitrate. The filtration step is not necessary. The salt (lead gallate) must be washed in a saturated solution of gallic acid dissolved in alcohol to have a satisfactory stability. The product is a useful photosensitive material which can be reduced to a photographic image readily by being heated at 100° C. or by exposure to direct bright sunlight.

EXAMPLE 4

At 0° C., prepare a saturated solution of lead trichloroacetate in methyl alcohol. Also at 0° C. prepare a saturated solution of phenolphthalein in methyl alcohol. At 0° C. in weak red light or in the absence of visible light mix the two solutions together. Then at 0° C. slowly add part of a solution of one gram of potassium hydroxide dissolved in one kilogram of methyl alcohol to the above mixture, continuing to add the said potassium hydroxide solution until a heavy precipitate of lead phenolphthaleinate forms, and then cease the addition. The precipitate is then washed with a saturated solution of phenolphthalein and methyl alcohol and the phases which form are separated by decantation. The precipitate is then washed with methyl alcohol, and the phases are again separated by decantation. The product is a useful photosensitive material which can be reduced to a photographic image readily by being heated at 100° C. or by exposure to direct bright sunlight.

EXAMPLE 5

Prepare a saturated solution of mercuric trichloroacetate in benzene at 20° C. to 30° C. At the same temperature range also prepare a saturated solution of 1,3,5-trihydroxybenzene in benzene. Mix equal parts of the two solutions in red light, and filter off the precipitate which forms and discard the precipitate. To the filtratae solution slowly add a solution of one gram of potassium hydroxide dissolved in 50 milliliters of methanol plus 50 ml. of distilled water, in the same temperature range. A precipitate forms which is the mercuric salt of 1,3,5-trihydroxybenzene. Continue to add the potassium hydroxide solution until the precipitate barely darkens, and stop at that point. In less than five minutes wash the salt precipitate with methanol and then in a saturated solution of 1,3,5-trihydroxybenzene in methanol. The product is a useful photosensitive material which can be reduced to a photographic image readily by being heated at 100° C. or by exposing to direct bright sunlight.

EXAMPLE 6

Repeat the procedure of Example 5, in this case employing mercurous trichloroacetate in place of mercuric trichloroacetate, and beta-dihydroxybenzene (resorcinol) in place of the 1,3,5-trihydroxybenzene used in Example 5. Following the procedure of that example, and washing the salt precipitate which forms with methanol and then in a saturated solution of beta-dihydroxybenzene in methanol, results in a stable, photosensitive product which can be converted to a photographic image by being heated at 100° C. or by exposure to direct bright sunlight.

What is claimed is:

1. A process of preparing a photosensitive compound from the group consisting of the silver salt of para-bromophenol and lead gallate comprising contacting and reacting solutions of, in the case of preparation of the silver salt of para-bromophenol, the metal compound silver nitrate and the strong reducing agent para-bromophenol, and in the case of preparation of lead gallate, the metal compound lead nitrate and the strong reducing agent gallic acid, the reaction being carried out in the absence of visible light with slow addition of a base in an amount to cause reaaction of said metal compound and said reducing agent and in an amount less than that which is required to reduce the metal ions supplied by said metal compound to a lower valence state, at a temperature of from the melting point of the reaction mixture to 30° C., recovering the reaction product and washing it in a solution of the acid form of the strong reducing agent.

2. The process of claim 1 in which silver nitrate is reacted with para-bromophenol, the reaction product is the silver salt of para-bromophenol, and said para-bromophenol silver salt reaction product is washed with a solution of p-bromophenol.

3. The process of claim 1 in which lead nitrate is reacted with gallic acid, the reaction product is lead gallate and said lead gallate reaction product is washed with a solution of gallic acid.

References Cited

UNITED STATES PATENTS

| | | | |
|---|---|---|---|
| 1,417,167 | 5/1922 | Guggenheim | 260—430 |
| 1,644,258 | 10/1927 | Lyons | 260—435 |
| 1,889,383 | 11/1932 | Schmidt | 260—438.1 |

FOREIGN PATENTS

| | | |
|---|---|---|
| 156,103 | 3/1922 | Great Britain. |

OTHER REFERENCES

Whitmore, Organic Compounds of Mercury, The Chemical Catalog Company, Inc., New York (1921), p. 207.

Chemical Abstracts, vol. 52, p. 8108 (1958).

Myers, reprint from J. of Laboratory and Clinical Medicine, vol. VI, No. 7, April 1921, pp. 1–3, 8–12.

TOBIAS E. LEVOW, Primary Examiner

H. M. S. SNEED, Assistant Examiner

U.S. Cl. X.R.

260—435